Oct. 8, 1963 R. A. ERICKSON 3,106,294

FILE FOR OFFICE OR PHONOGRAPH RECORDS

Filed May 8, 1961

3,106,294

FILE FOR OFFICE OR PHONOGRAPH RECORDS

Rudolph A. Erickson, Vashon, Wash.
(831 W. Nickerson St., Apt. 17, Seattle, Wash.)

Filed May 8, 1961, Ser. No. 108,337
2 Claims. (Cl. 211—40)

This invention relates to an improved file suitable for office records or phonograph records enclosed in their cardboard envelopes, or, more generally, a file that will systematically and accessibly hold either square or rectangular objects that, in the normal process of either being delegated into semi-storage or withdrawn from semi-storage, are handled with the hand, or, more specifically, with the fingers, the thickness of said objects being very small compared to the other dimensions.

It is the object of the present invention to provide a filing system in which each filed object is immediately accessible with no intermediate steps being necessary to provide for said accessibility.

Another object of the present invention is to provide a system of indexing that will allow for complete visibility of all indexing tabs, hereinafter referred to as index tabs, at all times.

Because of the above stated objects and other objects hereinafter stated, this file is intended for use as an active-record file, i.e., its primary function is to hold objects that are referred to frequently as distinguished from a storage type of file.

An advantage of the present invention derives from its non-mechanical nature. Since there are no levers to depress or slides to manipulate to provide for the accessibility of the desired object, this file can be produced at a reasonable cost.

Figure 1:
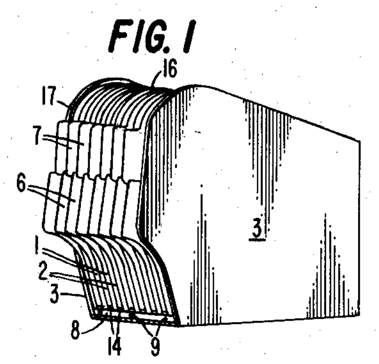

Referring to the drawing, which is an embodiment of the present invention, FIGURE 1 is a view in perspective of a 15 section file.

Figure 2:
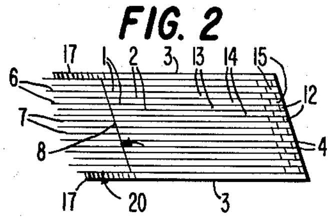

FIGURE 2 is a plan view of the 15 section file shown in FIGURE 1.

Figure 3:
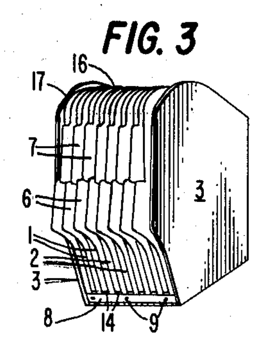
Figure 4:
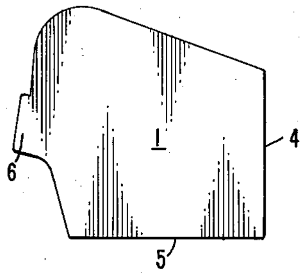
Figure 6:
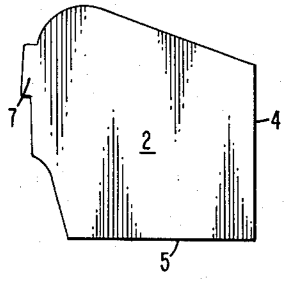
Figure 5:
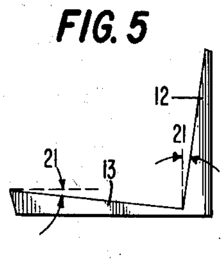
Figure 7:
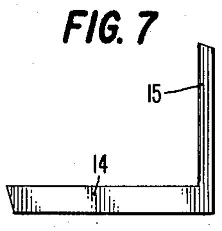

FIGURE 3 is a front view of said file and FIGURES 4, 5, 6, and 7 consists of side views of the components of two adjacent sections of said file showing separators, FIGURES 4 and 6, and rack sections, FIGURES 5 and 7 that normally would be in juxtaposition in the order of the figure numbers but here are dissected in order to show the positioning facilities of said file.

Figure 8:
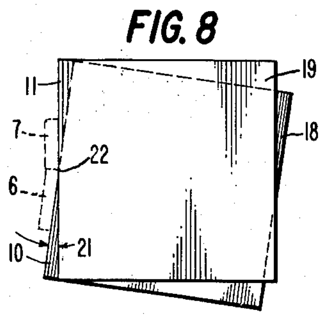

FIGURE 8 shows the spatial relationship in the lateral plane of two objects filed in adjacent sections in said file. Their relationship to their respective index tabs 6, 7, is also indicated.

Referring now to the construction of the file, FIGURE 1 shows that the present invention consists of a plurality of separators, 1, 2, said separators being fabricated from a hard paper, fiberous or plastic compound, or other suitable tempered material having semi-rigid qualities. Each separator 1, 2, is spaced at an equal and uniform distance in relation to its adjacent separator by virtue of being rigidly fixed along the back 4 and bottom 5 edge. Said rigidity is accomplished by utilizing the rack sections FIGURES 5, 7 as spacers for the separators 1, 2 of FIGURES 4 and 6, and the back limit-stops 12, 15 along the back edges adjacent the back periphery of the adjoining separators and the racks 13, 14 along the bottom edges adjacent the bottom periphery of the adjoining separators. The rack sections FIGURES 5, 7 are fabricated from any suitable hard, non-compressible material. All parts are in juxtaposition, the separators 1, 2, the rack sections FIGURES 5, 7, and the two end plates 3 being in a perpendicular relation to the bottom 5 and also to the table, desk or other supporting surface when in use. An ornamental concealment plate 8 is attached to the front bottom edge of the file with escutcheon pins 9. The protective end plates 3 are fabricated of thick rigid stock and extend somewhat beyond the top 16 and frontal 17 periphery of the separators 1, 2.

The above component parts held in juxtaposition in the specific relation hereinafter described by means of a suitable adhesive comprises the present invention.

Accessibility of a filed object is provided for by utilizing a system of staggered angular sections of rack FIGURES 5, 7 configuration. Alternate rack sections FIGURE 5 are designed to hold the filed object at a slight vertical angle 21 as related to its adjacent rack section FIGURE 7. Adjacent filed objects, such as two phonograph record envelopes 18, 19, will then be held in the relative positions as shown in FIGURE 8. The point 22 is common to all filed objects and is midway along the frontal periphery of said filed objects. This point 22 will be referred to in the appended claims as the pivotal point. Shaded areas 10, 11 indicate accessibility areas. Said accessibility is further enhanced by virtue of the generous width of each rack section FIGURE 5, 7.

Objects held in the file will have upper 11 or lower 10 accessibility areas depending on the incline 21 or lack of said incline of the specific rack 13, 14 that supports said object. This will provide for two tiers of filed objects, a feature that could be of aid for classification purposes.

Visibility of the index tabs 6, 7 is provided for by arranging the separators 1, 2 and the rack sections FIGURE 5, 7 at an angle 20 in the horizontal plane in relation to the front of the file as represented by the concealment plate 8. The back of the file 4 remains parallel with the front of said file. This angle 20 will, in most cases, be less than 90 degrees altho in certain embodiments when the file would be approached from the left under normal conditions of use said angle would be more than 90 degrees. The index tab viewing angle is homologous to the convenient angle 20 at which the filed object would physically be handled when either placing in or removing said object from the file.

As a feature peculiar to the present invention, the index tabs 6, 7 serve a dual purpose. Besides providing space for indexing or other identification information said tabs also serve the purpose of initial or starting guides when inserting an object to be filed. Index tabs appended to separators in file sections (FIGURE 4 in juxtaposition to FIGURE 5) holding objects in lower tier formation are below the pivotal point 22 of filed objects while index tabs appended to separators in file sections (FIGURE 6 in juxtaposition to FIGURE 7) holding objects in upper tier formation are above the said pivotal point of said filed objects. The furthermost bottom corner of the object to be filed will be held in juxtaposition to its appropriate index tab 6, 7 in the initial step in filing said object. Said filed objects are slideable removeable.

The outer periphery of each separator 1, 2 and the two end plates 3 excepting the back 4 and bottom 5 of said separators and end plates may be modified for esthetic, environmental or practicability reasons.

Another embodiment of the present invention would eliminate the use of the index tabs 6, 7. The accessibility areas of each filed object would then provide the space for indexing or other identification information. Random filing would necessitate the use of both accessibility areas of each filed object.

While this invention has been described with particular reference to the construction shown in the drawings and while various changes may be made in the detail construction, it should be understood that such changes shall be within the spirit and scope of the present invention as defined by the appended claims.

Having thus described the invention, I claim:

1. A frontal, top-frontal approach type of active office or phonograph record file comprising a plurality of separators with the top and frontal peripheries of said separators being of variable linear design, with suitable index tabs appended to the frontal peripheries thereof, the plane surface of each separator being fixed at a uniform distance in relation to the plane surface of its adjacent separator by reason of a plurality of rack sections, each rack section comprising the rack proper to which is appended a back limit-stop, said rack sections serving also as spacers to the separators along the back and bottom edge adjacent the periphery of said separators and being in juxtaposition thereto with various of the rack sections being in a fixed spatial relationship with the other rack sections, said relationship comprising a staggered system of vertical plane configuration of said rack sections, wherein separators and rack sections are fixed at a variable angular configuration in the horizontal plane in relation to the front and back of said file.

2. A frontal, top-frontal approach type of active office or phonograph record file comprising a plurality of separators with the top and frontal peripheries of said separators being of variable linear design, with suitable index tabs appended to the frontal peripheries thereof, the plane surface of each separator being fixed at a uniform distance in relation to the plane surface of its adjacent separator by reason of a plurality of rack sections, each rack section comprising the rack proper to which is appended a back limit-stop, said rack sections serving also as spacers to the separators along the back and bottom edge adjacent the periphery of said separators and being in juxtaposition thereto with alternate rack sections tilted slightly in the vertical plane with respect to the front of the file to provide for the common pivotal point of each filed object being approximately midway along the foremost periphery of said filed object, wherein separators and rack sections are fixed at a variably angular configuration in the horizontal plane in relation to the front and back of said file.

References Cited in the file of this patent

UNITED STATES PATENTS

| | | |
|---|---|---|
| 2,402,746 | Goldich | June 25, 1946 |
| 2,966,156 | Scholfield | Dec. 27, 1960 |

FOREIGN PATENTS

| | | |
|---|---|---|
| 887 | Great Britain | of 1913 |
| 787,373 | Great Britain | Dec. 4, 1957 |